Dec. 12, 1944.  T. G. AITCHESON  2,364,768
MEANS AND METHOD FOR SECURING OPTICAL ELEMENTS
Filed Nov. 19, 1941

INVENTOR
THOMAS G. AITCHESON
BY
ATTORNEY

Patented Dec. 12, 1944

2,364,768

UNITED STATES PATENT OFFICE 2,364,768

MEANS AND METHOD FOR SECURING OPTICAL ELEMENTS

Thomas G. Aitcheson, Kenmore, N. Y., assignor to Spencer Lens Company, Buffalo, N. Y., a corporation of New York Application November 19, 1941, Serial No. 419,686

7 Claims. (Cl. 88—33)

This invention relates to optical devices and has particular reference to a new and improved means and method for adjusting or aligning the optical elements of such device and for securing said optical elements in said adjusted or aligned position.

An object of the invention is to provide a new and improved means and method for adjusting or aligning optical elements and securing said optical elements in said adjusted or aligned position.

Another object of the invention is to provide a means and method of mounting optical elements which will prevent any strain from being set up in said elements.

Another object is to provide means and method of mounting optical elements whereby said elements will not be moved out of alignment by shock or dropping of the instrument.

Another object of the invention is to provide a new and improved means and method for adjusting or aligning prismatic optical elements in optical device which allow greater adjustment of the elements and which will also allow the elements to be removed for cleaning and then replaced without disturbing the adjustment or the alignment of the elements.

Other objects and advantages of the invention will be apparent from the following description taken in connection with the accompanying drawing, and it will be understood that many changes may be made in the details of construction and arrangement of parts and steps of the process without departing from the scope of the invention as expressed in the accompanying claims. I therefore do not wish to be limited to the exact details of the construction and arrangement of parts and steps of the process shown and described as the preferred form and process set forth, as the preferred form has been shown by way of illustration only.

Referring to the drawing.

Figure 1:
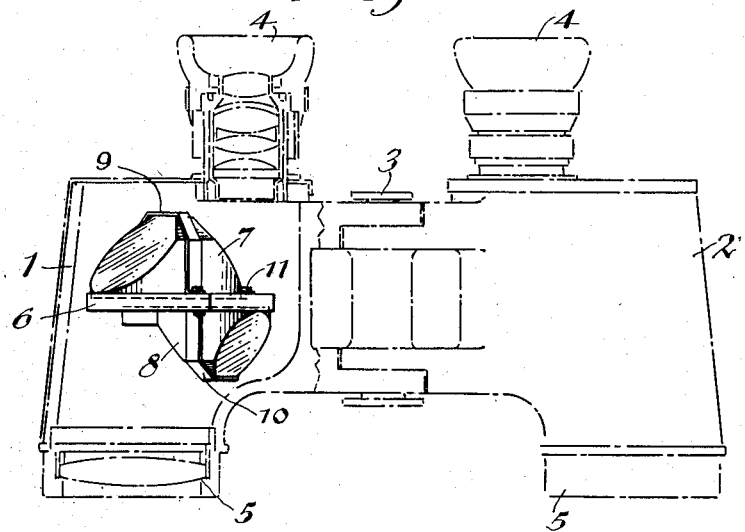
Fig. 1 is a top plan view, partially in section, of prism binocular embodying the invention.
Figure 2:
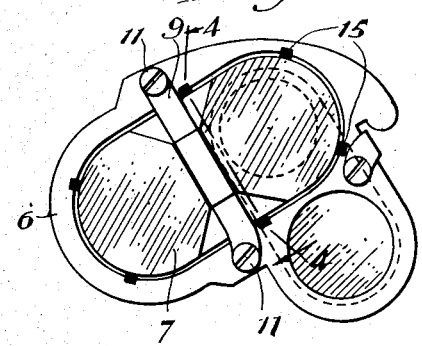
Fig. 2 is a view of the prism plate assembly of the binocular shown in Fig. 1.
Figure 5:
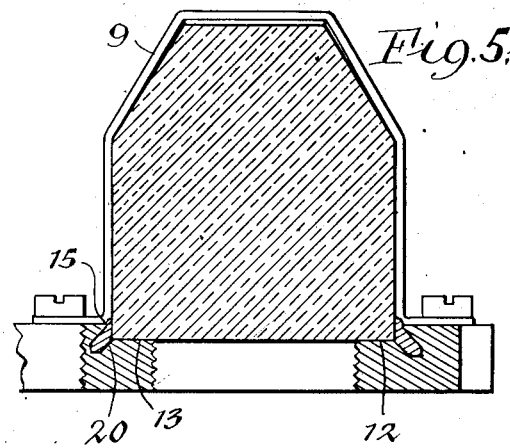
Fig. 5 is a view similar to Fig. 4 but showing another form of the invention.
Figure 3:
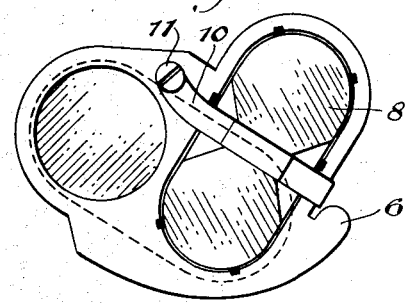
Fig. 3 is a view similar to Fig. 2 but looking from the objective side.

In the past numerous means and methods have been employed to allow adjustment and alignment of prismatic and optic elements and for securing said elements in adjusted or aligned position. Among these prior devices and methods have been various mechanical arrangements which were expensive and had numerous drawbacks, such as becoming loose from the shock received by the article during the use thereof, or strain was set up in the elements which frequently caused breakage thereof.

It is, therefore, a primary object of the present invention to provide a new means and method for adjusting or aligning such elements in optical devices and for securing said elements in said adjusted or aligned position, which will retain said elements in said adjusted or aligned position without any strain and which will also allow the removal of the elements for cleaning and the replacement thereof in the device without disturbing the adjustment or alignment thereof.

It is pointed out that while the present invention has been shown employed in conjunction with a prism holder device for a prism binocular, that the invention is, of course, not necessarily limited to such use but may also be used in practically any optical device or arrangement wherein it is desired to adjust or align optical elements and retain the same in said adjusted or aligned position.

Referring more particularly to the drawings, wherein similar reference characters designate corresponding parts throughout the several views, the prism binocular shown employing the invention comprising case 1 and 1 and 2 pivotally connected by the hinge member 3 and each having an eyepiece 4 and an objective 5.

In each of the casings 1 and 2 is a prism plate or support 6 each supporting a pair of prisms 7 and 8.

The prism plate or support 6 supports the prisms 7 and 8 in such a position that light entering the casing through the objective 5 passes through an opening in the prism plate or support 6 and enters the prism 7 which reflects said light through another opening in said prism 8, which in turn, reflects said light through a still further opening in said prism plate or support 6 and into the eyepiece 4 where it is seen by the observer.

In order for the light entering the prism 8 through the objective 5 to be directed into the eyepiece 4 by the prism 8 it is essential that said prisms 7 and 8 be in proper adjusted or aligned relation with each other and be permanently secured in said adjusted or aligned relation. It is also essential that said prisms 7 and 8 be so retained on said prism plate or support 6 that they may be removed therefrom for cleaning and then replaced on said prism plate or support 6 without disturbing the adjusted or aligned relation between said prism members 7 and 8.

The strap members 9 and 10 which are secured adjacent their ends to the prism plate or support 6 by means of the screw members 11 will provide for retaining said prism members 7 and 8 on said member 6 as hereinafter described.

The prism plate or support 6 may be formed in any desired manner, although I prefer to form this member diecasting and this member 6 is provided with the recess portion 12 of substantially the contour of the optical element it is secured thereon by a slightly larger area than said optical element. On the opposite side of said member 6 is provided a similar recess portion 13 for receiving the prism 8.

Adjacent the contour of said recess portions 12 and 13 are formed the openings 14. These openings may be of any desired shape or number, although I prefer to have one of said openings adjacent the opposite ends of said strap members 9 and two others adjacent each end of recess 12. The other two openings, 15 and 16, are placed at a 45 degree angle from the line of recess. When the prism plate or support 6 is dicast the openings 14, 15, and 16 are preferably square and flat bottom for ease of manufacture. It is obvious that they may be of other contour or number.

Figure 6:
Fig. 6 is a perspective view of one of the adjusting members.

In each of these openings 14, 15, and 16 I place a member 17 of the shape shown in Fig. 6, with a shoulder portion 18 thereof, adapted to extend under the lower edge of the prism when the prism is on the seat 12 or 13.

In securing the prisms in aligned or adjusted position on the prism plate or support 6 as described above, and place the member 17 in the openings 14 as also set forth above, and then place the prism members 7 and 8 on their seats 12 and 13 respectively, and place the strap members 9 and 10 in position to hold said prisms on said seats.

I then angularly adjust the prisms to align the same in desired optical alignment and then tighten the screws 11 to further tighten the strap members 9 and 10 to secure said prisms in said aligned position.

I then apply a heated iron to the portion 19 of the members 17 which members are made of a low melting point material or solder, etc., and when the heat is applied to said members 17 they cause to flow and engage the edge of the prism to retain the same in adjusted or aligned position.

Figure 4:
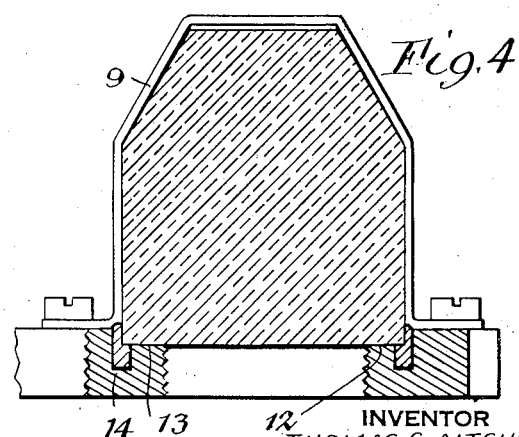
Fig. 4 is a sectional view taken on line 4—4 of Fig. 2 looking in the direction of the arrows.

In the construction shown in Fig. 4, I have shown the openings 20 extending into the plate or support 6 in angular relation with the recess or seat 12 which angular relation will further prevent the members 17 from pulling out of the openings 14 when the prisms are removed for cleaning or the like.

It will be apparent from the foregoing discussion that in order to clean the prisms it is merely necessary to remove the strap members 9 and 10 and then remove the prisms, and after they are cleaned it is merely necessary to replace the prisms on their respective seats and, because the members 17 have assumed the shape of the edge portion of the prisms with which they are in engagement that the prisms will again assume their adjusted and aligned position and then by merely replacing the strap members 9 and 10 the prism member may then be secured in adjusted and aligned relation.

From the foregoing it will be seen that I have provided simple, efficient and economical means and method for obtaining all of the objects and advantages of the invention.

Having described my invention, I claim:

1. In a device of the character described, a support, a recess on said support, a prism member having a portion in said recess, said recess being of sufficient area to allow pivotal adjustment of said prism member for optical alignment of said prism member, means engaging said prism member for retaining the same in said recess, a plurality of spaced openings in said support adjacent the supporting portion of said recess and adjacent the periphery of said prism member and communicating with said recess, and means in said spaced openings and engaging the periphery of said prism at said spaced points only to retain said prism in said optical alignment.

2. In a device of the character described, a support, a recess on said support, a prism member having a portion in said recess, said recess being of sufficient area to allow pivotal adjustment of said prism member for optical alignment of said prism member, means engaging said prism member for retaining the same in said recess, a plurality of spaced openings in said support adjacent the supporting portion of said recess and adjacent the periphery of said prism member and communicating with said recess, and extending below the plane of said recess, and means in said spaced openings and engaging the periphery of said prism at said spaced points only to retain said prism in said optical alignment.

3. In a device of the character described, a support, a recess on said support, a prism member having a portion in said recess, said recess being of sufficient area to allow pivotal adjustment of said prism member for optical alignment of said prism member, means engaging said prism member for retaining the same in said recess, a plurality of spaced openings in said support adjacent the supporting portion of said recess and adjacent the periphery of said prism member and communicating with said recess, and extending below the plane of said recess, and fusible means in said spaced openings and engaging the periphery of said prism at said spaced points only to retain said prism in said optical alignment.

4. In a device of the character described, a support, a recess on said support, a prism member having a portion in said recess, said recess being of sufficient area to allow pivotal adjustment of said prism member for optical alignment of said prism member, means engaging said prism member for retaining the same in said recess, a plurality of spaced openings in said support adjacent the supporting portion of said recess and adjacent the periphery of said prism member and communicating with said recess, and extending below the plane of said recess, and L shaped fusible means in said spaced openings and engaging the periphery of said prism at said spaced points only to retain said prism in said optical alignment.

5. The method of supporting an optical element in aligned relation comprising forming a support, forming a seat surrounding an opening in said support of larger area than the surface of the optical element to be supported thereby forming a plurality of spaced openings in said support adjacent said seat and communicating therewith, placing fusible means in said openings, placing said optical element on said seat, aligning said optical element and applying heat to said fusible means to cause said fusible means to engage the periphery of said element at spaced points only to retain said element in said aligned position.

6. The method of supporting an optical element in aligned relation comprising forming a support, forming a seat surrounding an opening in said support of larger area than the surface of the optical element to be supported thereby, forming a plurality of spaced openings in said support adjacent said seat and communicating therewith and extending below the plane of said seat, placing fusible means in said openings, placing said optical element on said seat, aligning said optical element and applying heat to said fusible means to cause said fusible means to engage the periphery of said element at spaced points only to retain said element in said aligned position.

7. The method of supporting an optical element in aligned relation comprising forming a support, forming a seat surrounding an opening in said support of larger area than the surface of the element to be supported thereby, forming a plurality of spaced openings in said support adjacent said seat and communicating therewith and extending below the plane of said seat, placing L shaped fusible means in said openings, placing said optical element on said seat, aligning said optical element and applying heat to said fusible means to cause said fusible means to engage said element at spaced points only to retain said element in said aligned position.

THOMAS G. AITCHESON.